J. L. MASON.

MOLDS FOR MAKING BOTTLES.

No. 6,903. Reissued Feb. 8, 1876.

Witnesses.

Robt. H. Duncan

Benj. A. Smith

Inventor.

The Consolidated Fruit Jar Co.
(Assignee of John L. Mason)
by Saml. A. Duncan
Atty.

UNITED STATES PATENT OFFICE.

JOHN L. MASON, OF NEW YORK, N. Y., ASSIGNOR, BY MESNE ASSIGNMENTS, TO THE CONSOLIDATED FRUIT-JAR COMPANY, OF SAME PLACE.

IMPROVEMENT IN MOLDS FOR MAKING BOTTLES.

Specification forming part of Letters Patent No. 22,129, dated November 23, 1858; extended seven years; reissue No. 6,903, dated February 8, 1876; application filed December 8, 1875.

DIVISION A.

*To all whom it may concern:*

Be it known that JOHN L. MASON, of the city, county, and State of New York, has invented certain new and useful Improvements in Molds for Blowing Bottles, Jars, &c., of which the following is a full, clear, and exact description, reference being had to the accompanying drawing, making a part hereof, in which—

Figure 1:
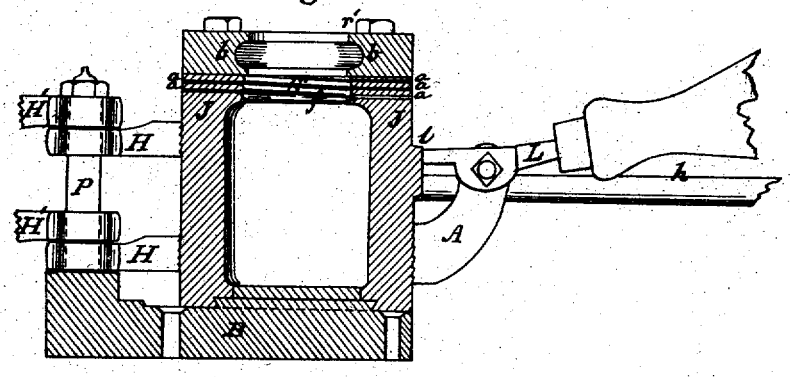
Figure 2:
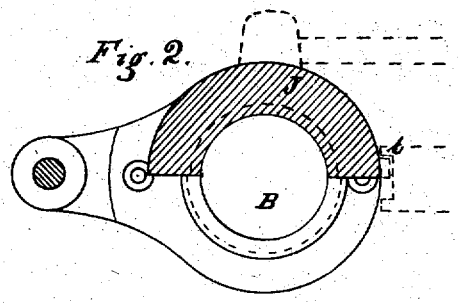
Figure 3:
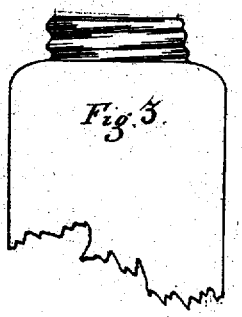

Figure 1 is a vertical cross section of the mold. Fig. 2 is a horizontal view of the bed and one of the jaws of the mold, and Fig. 3 shows a jar as made in this improved mold.

The invention relates specially to molds for blowing hermetically-sealing fruit-jars; and its object is to provide means for producing a rounded and uniform thread upon the exterior of the neck of the jar, for grinding off the lip of the jar or top of the neck without injury to the thread, and for so disposing of the surplus glass in blowing as not only to protect the neck of the jar from distortion by subsequent handling while hot, but to permit of the easy removal of this surplus glass without breaking the parts of the jar next adjacent thereto.

The mold proper is composed of a bed and two jaws, which can be opened and closed at pleasure, leaving, when closed, an opening at the neck only.

The bed is shown at B, and one of the jaws at J, the other jaw being entirely similar. The bed has at its center a circular elevation, around which the jaws, at their lower part, fit perfectly, as shown in the drawings, so that when the jaws are closed a tight receptacle is formed with the elevated part of the bed as its bottom, and the interior of the jaws as its sides or upright wall. The interior of the mold has the reverse form of the bottle or jar to be blown, and is provided with a rim or flange, marked *f*, extending inward at the bottom of the neck, a female screw, S, immediately above this rim, and another rim, marked *r*, immediately above the female screw. A swell or chamber, which I call a "blow-over," is arranged immediately above this rim *r*, and this blow-over is somewhat contracted at its upper part, for the purpose hereinafter explained.

The rims or flanges are perpendicular to the axis of the mold, and should extend inward toward the axis the same distance as the helix of the female screw. The threads of this screw should be rather dull on the face, but the bottom of the grooves between the threads should be rather sharp.

From the bottom of the screw-grooves there are small vents or channels *a a*, extending to the outside of the mold, to permit the escape of air from the grooves. The grooves of the screw, near the ends thereof, where they approach the rims, should be made more shallow until they are lost and filled up by the rims. The bed and jaws of the mold should be made thick to retain the heat. *h* is the handle of one of the jaws, by which it is opened and closed. The other jaw has a similar handle. H H are the hinge-arms of the jaw, and corresponding hinge-arms are provided for the other jaw, these latter being shown broken off and thrown back at H′ H′. P is the hinge-pin, on which the arms turn when the jaws are opened or closed. L is a lever-latch, which embraces the lips *l* of the jaws for holding them together, and A is the fulcrum of the latch.

It is not claimed that there is novelty in the lower part or in the exterior construction of the mold. The improvements which are claimed relate to the upper part thereof.

It is easily perceived that if the screw-thread on the neck of the jar should extend to the shoulder thereof, not only would this construction prevent a screw-cap from being screwed down tight, but also the lower end of the thread would interfere with the close fitting of the washer of india-rubber, which is to be used for making the cap air-tight on the neck; and it is equally obvious that if the screw-thread on the neck of the jar should extend entirely to the top thereof, in grinding the top off square to finish it up, the thread would be split and shivered, presenting sharp edges and points, which would cut and injure the cap, as well as the hands of the person using the jar, and be constantly liable to break.

It is to obviate these inconveniences that the rim or flange *f* is introduced between the lower end of the thread and the shoulder of the mold, and the rim *r*, immediately above the upper end of the thread, between it and the "blow-over." These rims serve to stop off the thread gradually, both at the top and bottom, and thus produce in the jar a groove between the screw and the shoulder of the depth of the thread, and leave a plain cylindrical surface of glass above the upper end of the thread, upon which the grinding-tool may operate when the jar is being finished up.

The neck, as produced by the combined action of the rims and screw-thread, is represented substantially in Fig. 3.

The bottom of the grooves, between the threads of the neck of the mold, are to be made sharp, for the following reason: In blowing, sharp grooves are not filled, and it is desirable that the thread on the neck of a glass jar should not be sharp, but round and uniform. If the bottom of the grooves of the mold are round, the glass pressed in by blowing will in some places go to the bottom of the groove, in which case the air will be pent in, and will prevent the glass being forced to the bottom in other places, thus spoiling the thread. But if the bottom of the groove be sharp the glass cannot be forced by blowing down to the bottom; consequently the thread will be round in its section, and thus there will be a small space beyond the glass to allow the air to pass along the grooves out to the vents or channels cut in the mold for its escape, thus producing a uniform thread, and as the glass cools the air can return to prevent a distortion of the screw.

The effect of the swell or blow-over is obvious. The increased diameter of the chamber, as compared with the diameter of the throat of the jar and the rim *r*, will cause the surplus glass to become very thin, as it spreads from the inner edge of the rim *r* along the bottom of the blow-over, from which it results that the surplus glass may be easily broken off in finishing up the jar without injury to the upper end of the neck.

It will be observed that the blow-over is shown as contracted at the top. Not only does the shape thus given to the blow-over aid in making the glass thin where it bends over the rim *r*, but it so disposes the surplus glass that it serves to preserve the neck proper of the bottle from distortion in handling before it is cool. The bottle or jar, as is well known by glass-blowers, is taken out of the mold before it is cold. This is done by the use of a rod, which is run into the bottle or jar, and its outer end is supported by the neck of the bottle, in the ordinary way. As the glass is still plastic the neck will often be slightly distorted, as far as its roundness is concerned, by the weight of the rod resting against the interior of the neck of the bottle or jar. This distortion would prevent the cap from fitting air or water tight, and, although this would be of no importance in bottles and jars generally, it would destroy the value of those which are required to be air-tight. Those blown in this mold, are not subject to this imperfection. The rod by which the jar is taken out of the mold, is supported by the edge of the orifice formed at the upper part of the blow-over, and any yielding which may occur will take place at this point, or in the thin part produced by the swell or blow-over, and will leave the screw-neck in its perfect form.

It will be seen, upon reference to the drawing, that the blow-over, as well as the body of the mold, is made in sections, one section of the blow-over being bolted to each jaw or half of the mold proper. From this it results that both the mold and its blow-over may be opened for releasing the jar, prior to its introduction into the annealing-oven, without breaking off the surplus glass from the neck of the jar, and, of course, the annealing of the jar can be carried on better when the metal blow-over has been removed than when it is allowed to remain upon the jar in the annealing-oven. In this particular this blow-over differs from the devices previously invented for the purpose of spreading out the surplus glass above the lip of the jar, and which, by reason of their peculiar construction, could not be removed from the jar without at the same time breaking off the surplus glass.

These are the advantages of the present invention, with others, of which it is not necessary here to make mention. The mold herein described will be found specially adapted for use in the process which forms the subject-matter of Division B of this same reissue.

What is claimed as new is—

1. The combination of the grooves of the mold with vents or air-passages to permit the air to escape, substantially as and for the purpose set forth.

2. A blow-over constructed in sections, and arranged to operate in connection with the body of the mold, substantially as described.

3. In combination with the screw-threaded neck of the mold, a rim or flange arranged above the upper end of the thread, between it and the chamber or swell which forms the blow-over, and operating substantially as and for the purpose set forth.

4. In combination with the screw-threaded neck of the mold, a blow-over contracted at its top, substantially as and for the purpose set forth.

THE CONSOLIDATED FRUIT-JAR COMPANY,
By STEPHEN R. PINCKNEY, *President.*

Witnesses:
ROBERT H. DUNCAN,
BENJ. A. SMITH.